Sept. 20, 1966 R. O. EIS ETAL 3,274,332
ELECTRICAL LEAD SEAL FOR PRESSURE VESSEL
Original Filed Dec. 4, 1962
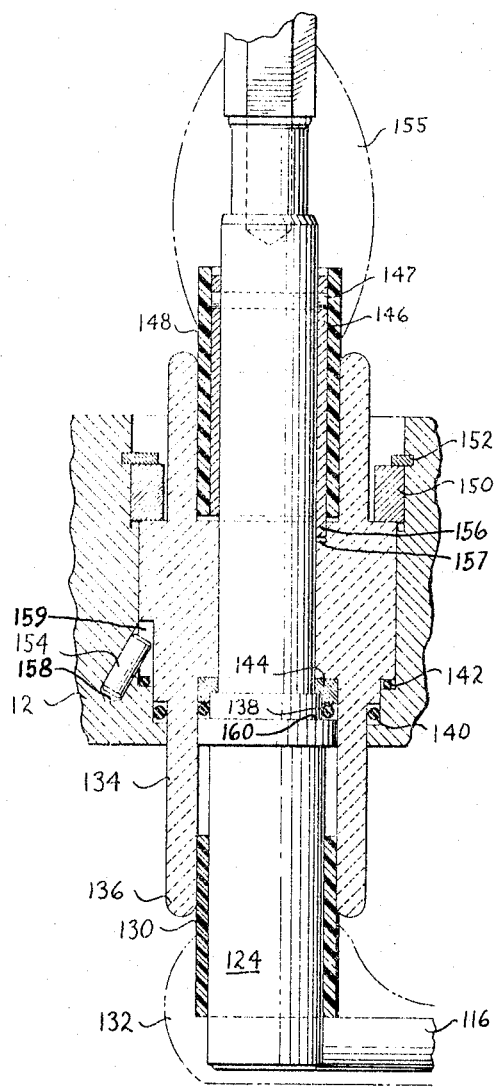
INVENTORS
RALPH O. EIS
LAWRENCE R. TOMHAVE
JAMES A. WALSH
BY
THEIR ATTORNEY 3,274,332
ELECTRICAL LEAD SEAL FOR PRESSURE VESSEL
Ralph O. Eis, Lawrence R. Tomhave, and James A. Walsh, Schenectady, N.Y., assignors to General Electric Company, a corporation of New York
Original application Dec. 4, 1962, Ser. No. 242,272. Divided and this application May 3, 1965, Ser. No. 471,779
1 Claim. (Cl. 174—152)

This application is a division of our copending application Serial No. 242,272, filed December 4, 1962, now U.S. Patent No. 3,218,490. The present invention relates to electrical leads seals for pressure vessels and is particularly adapted to provide electrical connection to a dynamoelectric machine stator enclosed within a pressure vessel, or stator shell.

A primary object of the present invention is to provide a lead seal comprising a plurality of coaxial components that are readily disassembled and not bonded or otherwise permanently secured together.

Briefly, in accord with one embodiment of the invention, a lead seal assembly comprises a solid cylindrical conductive stud and a cylindrical ceramic insulator coaxial therewith. An O-ring seal is effected between the stud and insulator, and between the insulator and the wall of a pressure vessel into which the assembly is insertable. Additionally, means are provided to limit relative rotation between the stud, insulator and vessel wall.

The drawing is a cross-sectional view in elevation illustrating an electric lead seal in accord with this invention.

Referring more specifically to the drawing illustrating the conductor seal, each conductor lead 116 is brazed to each stud 124 and a cylindrical insulator 130 of mica-resin, Textolite, Bakelite or other product is positioned over the stud and the assembly wrapped with glass or other insulating tape 132. A ceramic insulator 134 having an end 136 projects outwardly to partially encompass a portion of insulator 130. The main body of ceramic insulator 134 is positioned within the wall of the stator shell 12 and is equipped with surfaces designed to contact the shell wall and the stud outer surface. Shoulders are formed on the insulator 134 to accommodate O-rings 138 and 140 which prevent fluid leakage from the stator assembly in the event of can failure and leakage thereinto from the motor cavities. A shoulder 160 on stud 124 provides a seal surface and prevents outward movement of O-ring 138, and a metal ring 144 is located inwardly of O-ring 138 to facilitate its removal when necessary. The primary function of O-ring 142 is to prevent cracking of the ceramic insulator 134 when subjected to vibratory forces encountered during motor operation.

A metal sleeve 146 is held to the stud by a dowel pin 147 and an insulator 148 of mica-resin, Textolite, or the like, is positioned over the metal sleeve. The complete unit is held in the stator shell walls by a metal ring 150 secured in place by a snap ring 152.

In order to prevent rotation of the seal elements within the shell wall, the metal sleeve 146 is restricted in rotary movement with respect to the stud by dowel pin 147. The lower end of sleeve 146 is equipped with a tongue 156 designed to engage a groove 157 formed in the ceramic insulator 134 which effectively prevents relative rotation between the sleeve and ceramic insulator. To limit movement of insulator 134 in the wall, an opening 158 is formed in the stator shell wall to accept pin 154 of sufficient length to extend into a groove 159 formed in the ceramic insulator.

The particular advantages which flow from utilizing the seal described above is any element thereof may quickly and easily be replaced without having to replace the whole seal. The parts are not bonded or joined to one another by tape or other means. The only steps necessary for replacing any part is simply that of removing insulating tape 155 from the connection and removing snap ring 152. The seal assembly may then be lifted from the stator shell wall and upon disassembly and replacement of one or more parts, positioned again in the wall by reversing the steps which effected removal.

The foregoing is a description of an illustrative embodiment of the invention, and it is applicants' intention in the appended claim to cover all forms which fall within the scope of the invention.

What we claim as new and desire to secure by United States Letters Patent is:

A readily disassembled electric conductor lead seal assembly insertable in a substantially cylindrical walled aperture in a pressure vessel, said assembly comprising:
(a) a cylindrical stud of conductive metal positioned coaxially within the aperture in the pressure vessel and having first and second ends oppositely protruding respectively therefrom;
(b) a metal sleeve on said first end secured by a removable pin to said stud, said metal sleeve extending partially into the aperture and having a tongue extending from the innermost extremity thereof;
(c) first and second axially spaced insulating sleeves on said metal sleeve and said second end of the stud, respectively;
(d) a hollow ceramic sleeve having portions of the inner surface thereof in engagement with said first insulating sleeve, a central portion of said stud, and said second insulating sleeve, respectively;
(e) a groove in the inner surface of said ceramic sleeve accommodating said tongue to limit relative rotation between said stud and said ceramic sleeve;
(f) a shoulder on said stud intermediate said insulating sleeves and an O-ring engaging said shoulder to provide a pressure-tight seal between said stud and said ceramic sleeve;
(g) cooperating shoulders in the wall of said aperture and on said ceramic sleeve, respectively, and an O-ring between said cooperating shoulders providing a pressure-tight seal between the wall of said aperture and said ceramic sleeve; and
(h) means projecting from the wall of said aperture into a corresponding groove in said ceramic sleeve to limit relative rotation between said wall and said ceramic sleeve;
(i) whereby an insulated lead seal is provided without bonding or otherwise permanently fixing the principal components thereof together, facilitating ease of disassembly and component replacement.

References Cited by the Examiner
UNITED STATES PATENTS

| | | |
|---|---|---|
| 1,910,226 | 5/1933 | Austin _____ 174—153 |
| 2,158,492 | 5/1939 | Bishop. |
| 2,304,334 | 12/1942 | Boucher et al. ____ 174—153 X |

LARAMIE E. ASKIN, *Primary Examiner.*